United States Patent [19]

Bergmann

[11] Patent Number: 4,549,579

[45] Date of Patent: Oct. 29, 1985

[54] STRAIGHT-WAY VALVE

[75] Inventor: Konrad Bergmann, Wittlich, Fed. Rep. of Germany

[73] Assignee: American Standard Inc., New York, N.Y.

[21] Appl. No.: 623,643

[22] Filed: Jun. 22, 1984

[51] Int. Cl.[4] .......................... F16K 11/02; F16K 3/08
[52] U.S. Cl. ........................... 137/625.21; 137/625.31; 251/180; 251/208
[58] Field of Search ...................... 137/625.21, 625.31, 137/625.46; 251/304, 180, 208

[56]       References Cited
     U.S. PATENT DOCUMENTS 986,284  3/1911  Harkins ......................... 137/625.21
  1,738,135 12/1929  Bannister ....................... 137/625.31
  3,405,734 10/1968  Smit et al. ..................... 137/625.21

FOREIGN PATENT DOCUMENTS 1216488 11/1959 France ............................ 137/625.31
  1235296  5/1960 France ............................ 137/625.31

Primary Examiner—Arnold Rosenthal
Attorney, Agent, or Firm—James J. Salerno, Jr.; Robert G. Crooks; John P. Sinnott

[57] ABSTRACT

A straight-way valve assembly is provided with regulating elements in the form of discs, of which one is rotatably-mounted and includes flow ports, which correspond to flow ports of the other static discs, which static discs are arranged on opposite faces of the rotatable disc to form a mechanical, fluid tight seal, whereby the face of the rotatable disc directed away from the supply line includes one or several recesses that are in fluid communication with valve vent means when the valve is in its closed position; the recesses extending radially outwards across the surfaces of the rotatable disc.

4 Claims, 7 Drawing Figures

STRAIGHT-WAY VALVE

FIELD OF THE INVENTION

This invention is directed to a straight-way valve, having regulating elements in the form of discs, one of which is rotatably mounted and having flow ports which correspond with flow ports of two static discs, which are arranged on either side of the rotatably mounted disc so that each face of the rotatably mounted disc forms a mechanical seal at the respective interface of the statically mounted discs.

PRIOR ART

Straight-way valves of this type for the regulation and flow interruption of fluids are known, for example several forms of this type of valve are shown in German Patents and Patent Application DT-PS Nos. 896 438, 1 103 097 and also DT-OS No. 29 45 834. Straight-way valves with disc-like regulating elements are preferred because they can be simple in design and correspondingly, inexpensive to manufacture, however, a disadvantage in these designs is that they do not permit automatic venting of the valve at the outlet side of the fluid line when the valve is in its closed position. A venting means of this kind is advantageous and is required where the fluid carried in the line is a gas so that when dismantling the fluid line from the consumer plant side of the valve the maintenance work can be carried out in safety.

SUMMARY OF THE INVENTION

The invention is based on the object of overcoming the above-mentioned disadvantage and providing a straight-way valve of the type mentioned, which is simple in design and ensures reliable operation.

This object has been successfully achieved by the fact that the face of the rotatable disc, which is facing away from the supply line, includes one or several recesses in the face areas, which recesses, when the valve is in its closed position, are in fluid communication with venting outlets formed in the valve and which recesses extend radially over these face areas between the flow ports in the static disc at the outlet side of the valve.

According to the invention, the fluid line on the valve side of the closed valve is always automatically vented. The design and manufacture costs for a valve, in accordance with the invention, are quite low.

BRIEF DESCRIPTION OF THE DRAWINGS

The subject matter of the invention is illustrated in the drawings in the form of a design example, as follows.

DETAILED DESCRIPTION OF THE DRAWINGS

Figure 1:
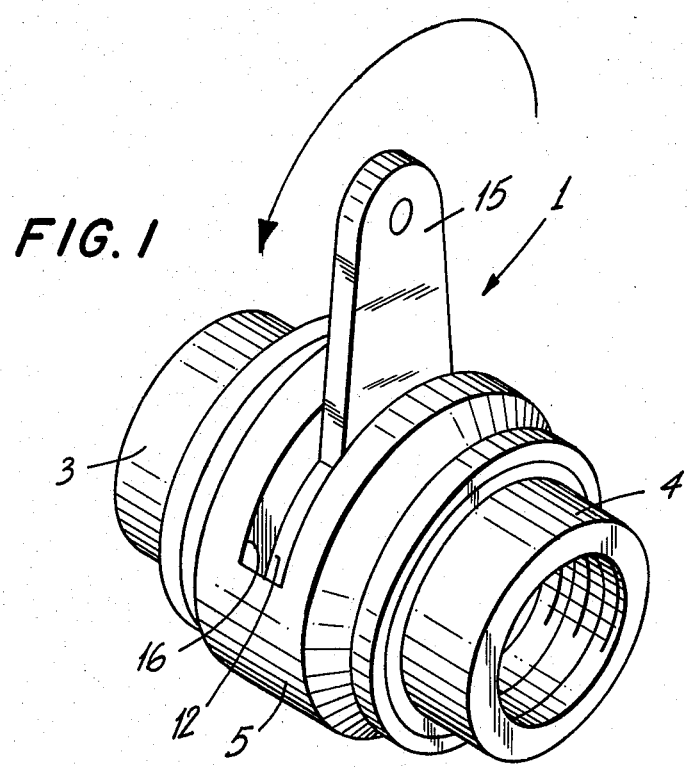
FIG. 1 is an isometric view of a straight-way valve adapted to be mounted in a fluid supply line, not shown, in accordance with the invention.
Figure 2:
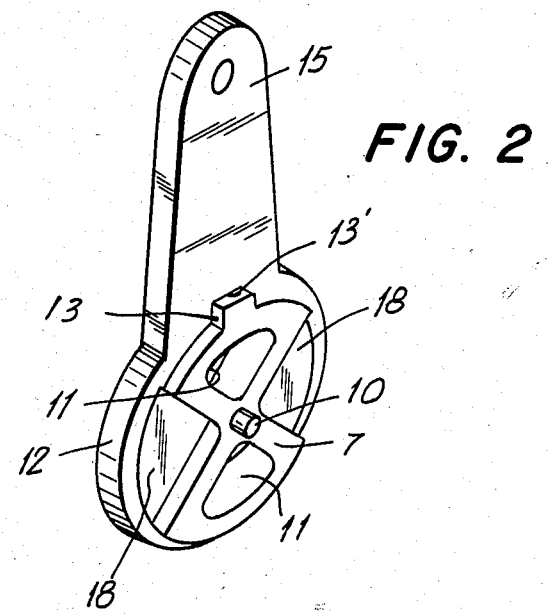
FIG. 2 is an isometric view of the valve actuating device with the rotatable disc mounted therein.
Figure 3:
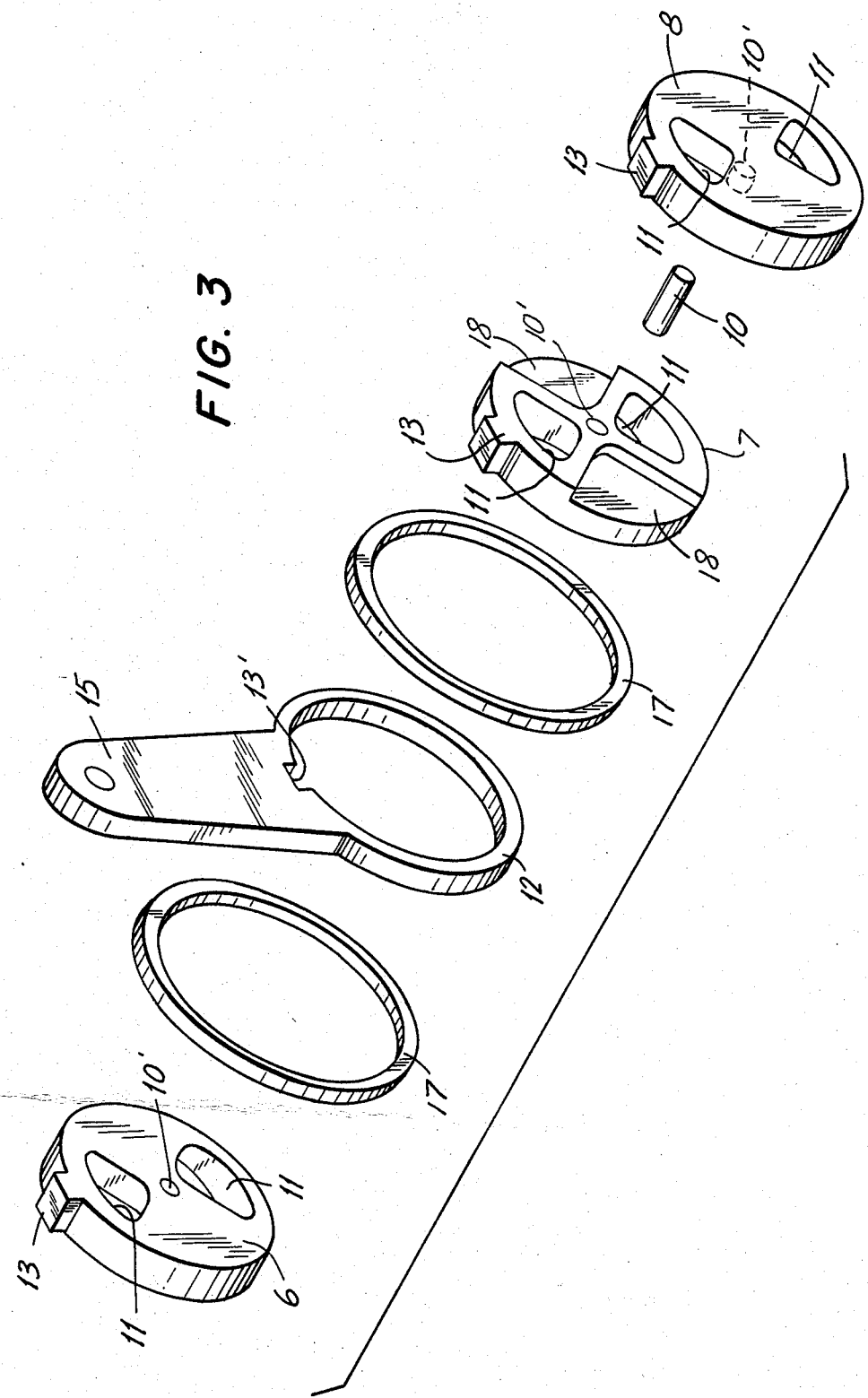
FIG. 3 is an exploded isometric view of the straight-way valve elements, which are housed in the valve body shown in FIG. 1.
Figure 4:
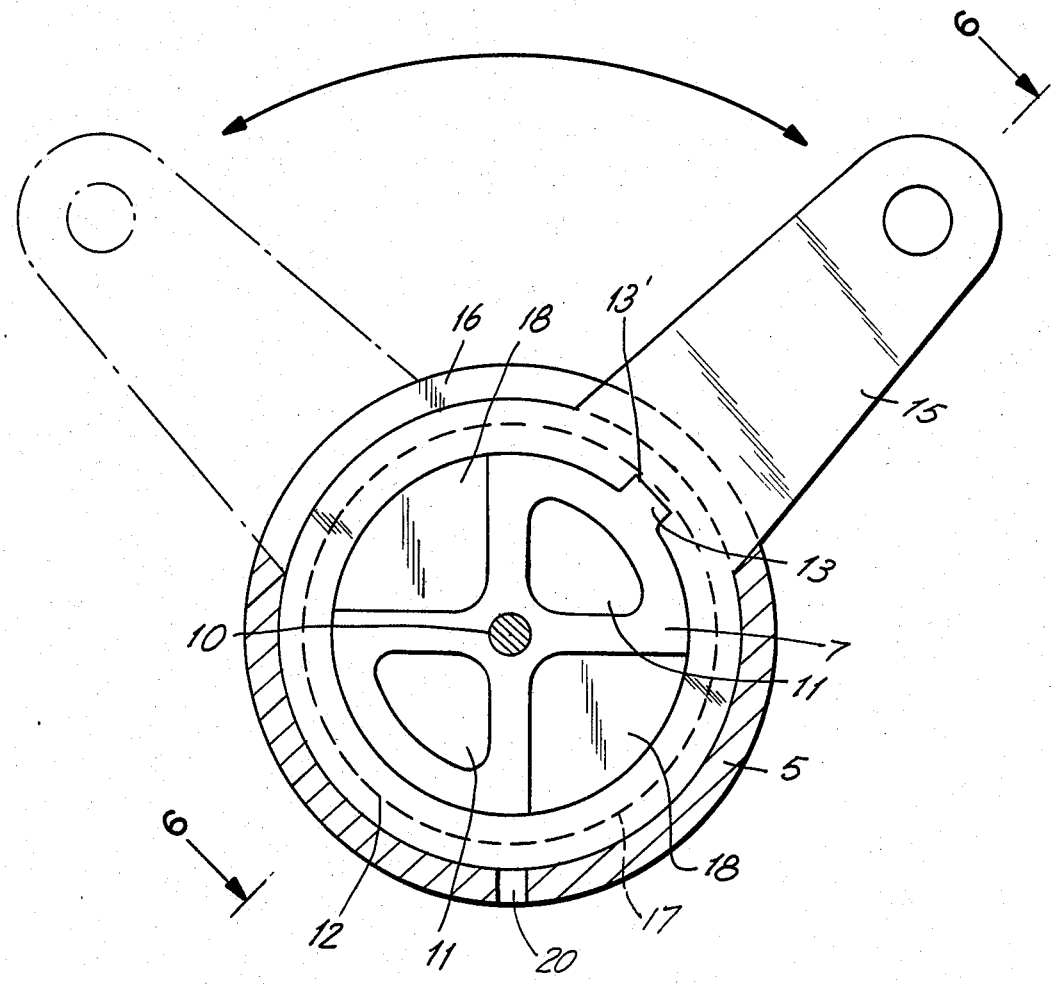
FIGS. 4 and 5 are elevational views in cross section of the straight-way valve of FIG. 1, showing the rotatable disc in its opened and closed positions.
Figure 5:
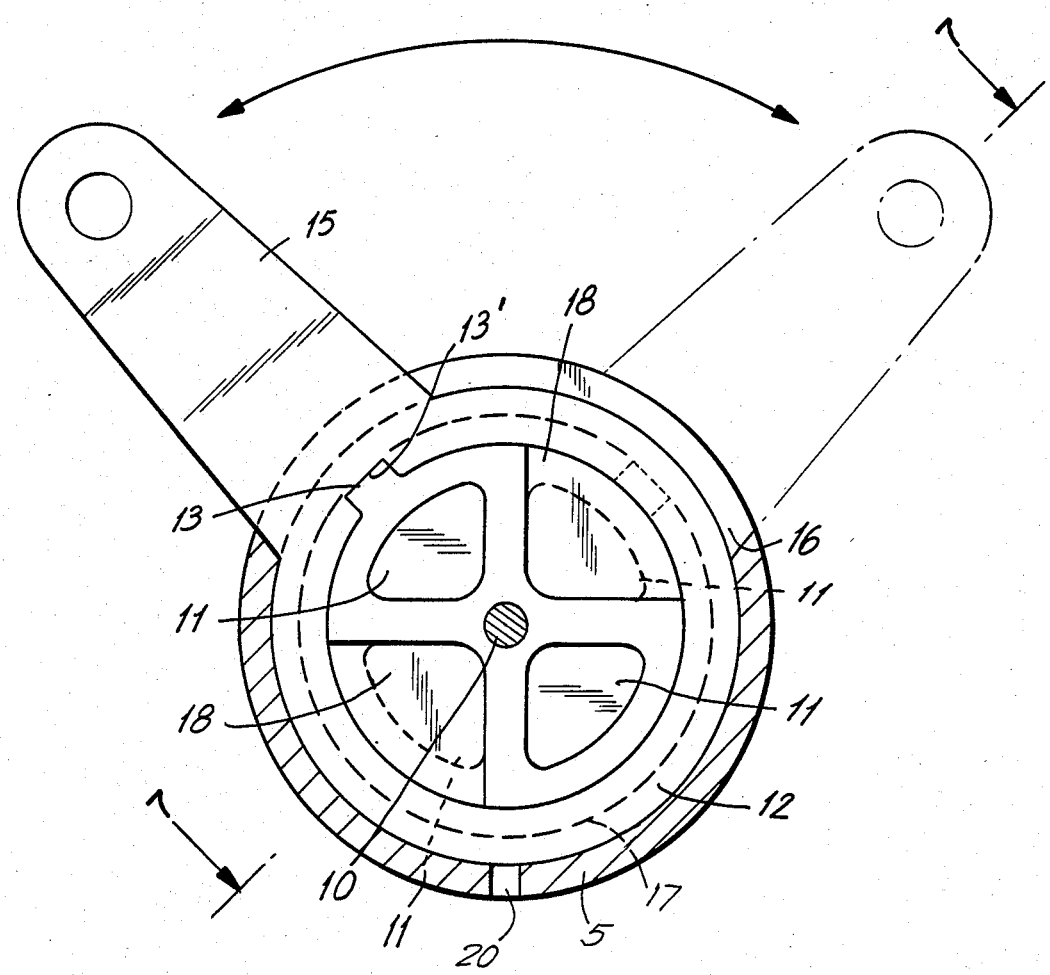
Figure 6:
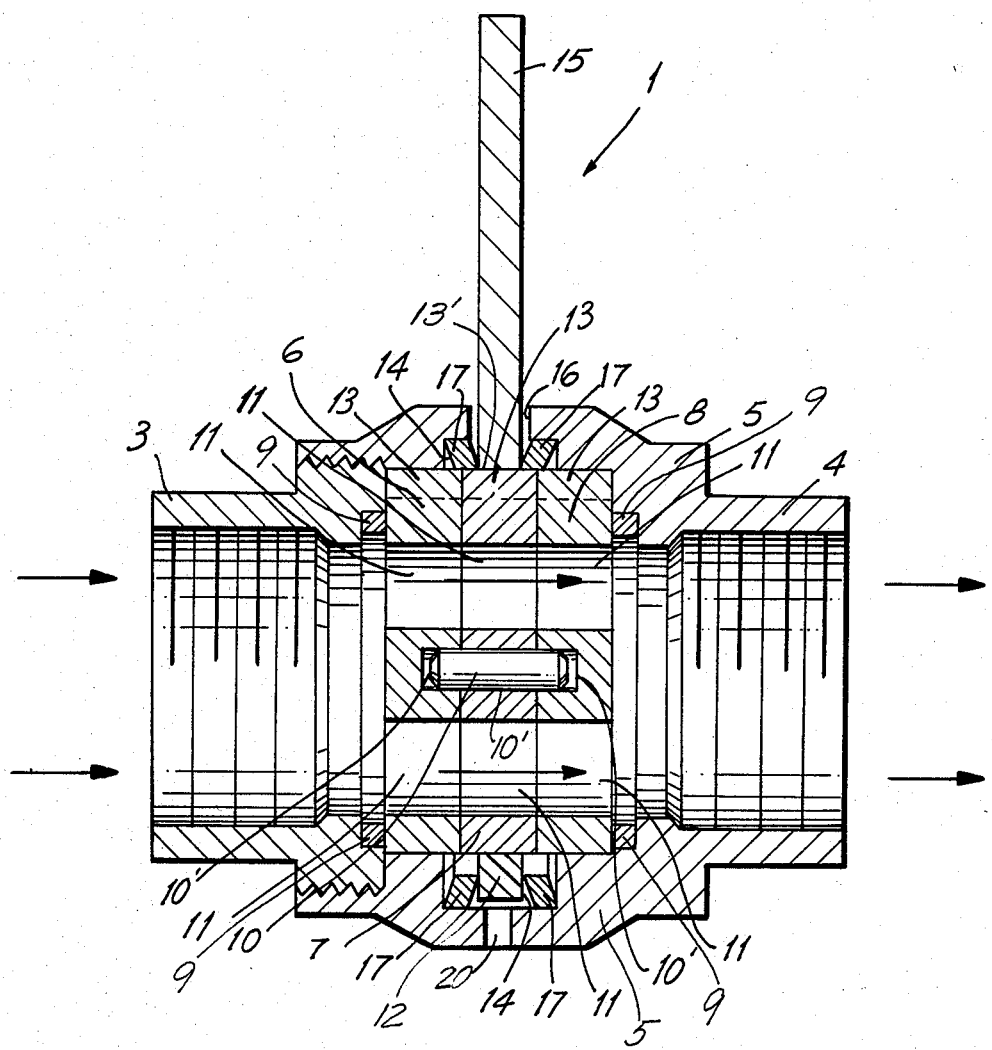
FIGS. 6 and 7 are an elevational view in section taken along the lines 6—6 and 7—7 FIGS. 4 and 5, respectively.
Figure 7:
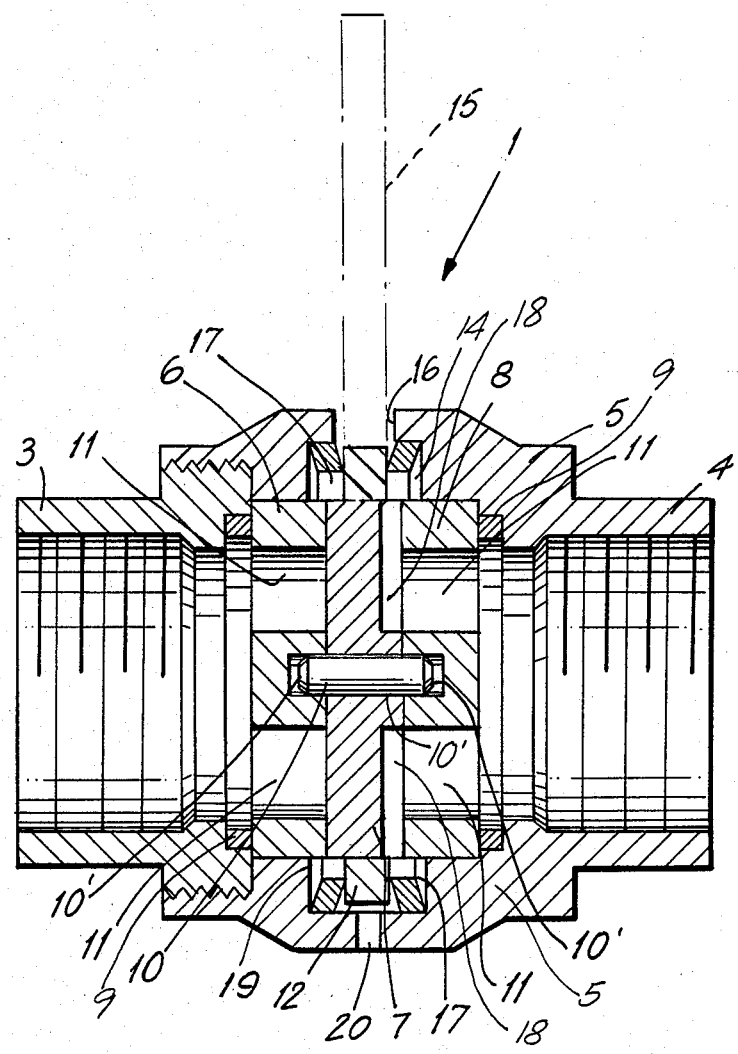

In the drawings, FIGS. 1–7 illustrate one form of a straight-way valve assembly 1. Valve assembly 1 includes a valve body having two connection bosses 3 and 4 and central section 5 mounted therebetween. The valve body includes the regulating elements which are housed therein, shown most clearly in FIG. 3. As illustrated in FIG. 3, the regulating elements comprise three discs 6,7 and 8, of which the middle disc 7 is rotatably mounted. The discs 6,7 and 8 are preferably made of aluminium oxide. Discs 6, 7 and 8 are mounted in section 5 and discs 6 and 8 lie against the opposite faces of disc 7 to form a fluid tight, mechanical seal between their respective adjacent faces. The two external static discs 6 and 8 are pressed against rotating disc 7 by means of seal rings 9. Disc 7 is mounted for rotation by means of shaft pin 10, which is located in corresponding recesses 10', along the axial center line of static discs 6 and 8. The discs 6,7 and 8 are provided with flow ports 11.

As shown in FIG. 2, rotatable disc 7 is connected to an actuating device, having an annular part 12, which completely encloses rotatable disc 7 and is thus radially positioned. Disc 7 has a lug 13, which is engaged in a corresponding groove 13' in the annular part 12 of the actuating device, so that disc 7 rotates on shaft pin 10 and the only forces acting on disc 7 are the radial forces encountered when the actuating device is shifted from its closed to its opened positions. Annular groove 14 is provided in central section 5, which forms a receptacle for annular part 12. A slot 16, formed in a section of groove 14, through which a lever-shaped part 15 of the actuating device protrudes therefrom. Slot 16 extends a distance around central section 5 so that the actuating device for housing disc 6 can be assembled in the valve body. In the receptacle recess 14 are bearing rings 17 in the form of cup springs, which exert spring pressure in the axial direction on the annular part 12 of the actuating device, and in this way absorb transverse forces. As is also evident, the moving disc 7 features two recesses 18. These recesses 18 are provided in the face of the moving disc 7 facing away from the supply line, and more specifically in the areas of said face which remain free at the outlet side in the illustrated closed condition of the valve owing to the flow ports 11 in the static disc 8. The recesses 18 extend readially outwards across these face areas and communicate with venting outlets which are formed by the longitudinal slot 16, partial support of the bearing rings 17 (see position 19) and also by bores 20 in the valve body. In the opened condition of the valve, the recesses 18 and the corresponding face areas are concealed by the sealing faces of the static disc 8.

As already mentioned, the illustrated and described design is only one example for realization of the invention and is not limited thereby; rather, the basic idea according to the invention provides other variations and modifications, particularly with regard to the arrangement and design of the individual parts with regard to the actuation of the rotable disc.

I claim:

1. A straight-way valve assembly comprising:
    a valve body having a longitudinal passageway extending therethrough and a circumferential slot formed between the ends thereof, each end of said passageway having inlet and outlet openings to couple, respectively, to fluid supply and delivery lines;

said valve body having an annular recess formed between the ends of said passageway and being aligned with said circumferential slot;

regulating elements, operably mounted in said valve body, include a plurality of discs, one of which is mounted for rotation, at least one of said other discs statically mounted in said valve body and arranged in face-to-face contact against said rotatable disc, actuating means disposed in said slot and coupled to said rotatable disc and a pair of spaced apart resilient bearing rings positioned around opposed faces of said actuating means and disposed in said annular recess;

an axle mounted through an axial bore formed in said rotatable disc, at least one end of which is disposed in a corresponding recess of said at least one static disc for rotation therein;

said rotatable disc having a plurality of flow ports which correspond with flow ports formed in said at least one static disc, said rotatable disc having at least one recess formed in the surface facing away from said fluid supply line, said at least one recess extending between said flow ports to provide disc vent means; and said disc vent means communicating with said annular recess and said circumferential slot so that said at least one recess of said rotatable disc is in fluid communication with said annular recess and circumferential slot to provide a pathway to vent fluid from entering the delivery lines when said straight-way valve is in its closed position.

2. The straight-way valve, in accordance with claim 1, wherein said at least one static disc is a pair of discs mounted on opposite surfaces of said rotatable disc to form a fluid tight, mechanical seal.

3. The straight-way valve, in accordance with claim 2, wherein said rotatable disc includes a pair of recesses positioned between said flow ports and which extend radially across the surface of said rotatable disc.

4. The straight-way valve, in accordance with claim 3, wherein said recesses formed in said rotatable disc are in fluid communication with said vent pathway formed in said valve body when said valve is in its closed position.

* * * * *